United States Patent
VanBlon et al.

(10) Patent No.: US 10,073,671 B2
(45) Date of Patent: Sep. 11, 2018

(54) DETECTING NOISE OR OBJECT INTERRUPTION IN AUDIO VIDEO VIEWING AND ALTERING PRESENTATION BASED THEREON

(71) Applicant: Lenovo (Singapore) Pte. Ltd., New Tech Park (SG)

(72) Inventors: Russell Speight VanBlon, Raleigh, NC (US); Rod David Waltermann, Rougemont, NC (US); John Carl Mese, Cary, NC (US); Arnold S. Weksler, Raleigh, NC (US); Nathan J. Peterson, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 602 days.

(21) Appl. No.: 14/158,990

(22) Filed: Jan. 20, 2014

(65) Prior Publication Data
US 2015/0205577 A1 Jul. 23, 2015

(51) Int. Cl.
*G06F 3/16* (2006.01)
*H04H 60/33* (2008.01)

(52) U.S. Cl.
CPC ............ *G06F 3/165* (2013.01); *H04H 60/33* (2013.01)

(58) Field of Classification Search
None
See application file for complete search history.

(56) References Cited

U.S. PATENT DOCUMENTS

| | | | |
|---|---|---|---|
| 2,510,344 A | 6/1950 | Law | |
| 2,567,654 A | 9/1951 | Siezen | |
| 3,418,426 A | 12/1968 | Schlegel et al. | |
| 3,628,854 A | 12/1971 | Jampolsky | |
| 4,082,433 A | 4/1978 | Appeldorn et al. | |
| 4,190,330 A | 2/1980 | Berreman | |
| 4,577,928 A | 3/1986 | Brown | |
| 5,579,037 A | 11/1996 | Tahara et al. | |
| 5,583,702 A | 12/1996 | Cintra | |
| 6,046,847 A | 4/2000 | Takahashi | |
| 2004/0160419 A1 | 8/2004 | Padgitt | |
| 2006/0002572 A1* | 1/2006 | Smithers | H03G 9/005 381/104 |
| 2006/0092383 A1* | 5/2006 | Vinson | G03B 21/142 353/69 |

(Continued)

FOREIGN PATENT DOCUMENTS

CN 101221767 A 7/2008
CN 101867739 A 10/2010

(Continued)

OTHER PUBLICATIONS

Russell Speight Vanblon, Neal Robert Caliendo Jr.; "Automatic Magnification and Selection Confirmation" file history of related U.S. Appl. No. 14/322,119, filed Jul. 2, 2014.

(Continued)

*Primary Examiner* — Curtis Kuntz
*Assistant Examiner* — Kenny Truong
(74) *Attorney, Agent, or Firm* — John L. Rogitz

(57) ABSTRACT

In one aspect, when it is detected that a viewer of an audio video program is interrupted by something, the program may be increased in volume, paused, etc.

20 Claims, 5 Drawing Sheets

(56) References Cited

U.S. PATENT DOCUMENTS

| | | | |
|---|---|---|---|
| 2008/0278635 A1* | 11/2008 | Hardacker | H04N 5/44582 348/734 |
| 2009/0065578 A1 | 3/2009 | Peterson et al. | |
| 2009/0088224 A1* | 4/2009 | Le Gall | H04M 1/6008 455/570 |
| 2009/0204410 A1 | 8/2009 | Mozer et al. | |
| 2009/0259349 A1 | 10/2009 | Golenski | |
| 2009/0315740 A1 | 12/2009 | Hildreth et al. | |
| 2010/0079508 A1 | 4/2010 | Hodge et al. | |
| 2010/0146445 A1* | 6/2010 | Kraut | H04N 5/60 715/821 |
| 2010/0171720 A1 | 7/2010 | Craig et al. | |
| 2010/0199340 A1* | 8/2010 | Jonas | G06Q 10/10 726/8 |
| 2010/0211918 A1 | 8/2010 | Liang et al. | |
| 2011/0043617 A1* | 2/2011 | Vertegaal | G06F 3/011 348/78 |
| 2011/0065451 A1 | 3/2011 | Danado et al. | |
| 2012/0149309 A1 | 6/2012 | Hubner et al. | |
| 2012/0220311 A1 | 8/2012 | Rodriguez et al. | |
| 2012/0268268 A1 | 10/2012 | Bargero | |
| 2013/0021459 A1 | 1/2013 | Vasilieff et al. | |
| 2013/0044042 A1 | 2/2013 | Olsson et al. | |
| 2013/0170755 A1 | 7/2013 | Dalton et al. | |
| 2013/0246663 A1 | 9/2013 | Raveendran et al. | |
| 2013/0307771 A1 | 11/2013 | Parker et al. | |
| 2014/0270200 A1* | 9/2014 | Usher | H04R 1/1041 381/57 |
| 2014/0317524 A1 | 10/2014 | VanBlon et al. | |
| 2015/0104031 A1* | 4/2015 | Park | G10K 11/1788 381/71.6 |
| 2015/0185964 A1* | 7/2015 | Stout | G06F 3/0481 715/716 |

FOREIGN PATENT DOCUMENTS

| | | |
|---|---|---|
| CN | 101873447 A | 10/2010 |
| CN | 102624980 A | 8/2012 |
| CN | 101459717 B | 3/2013 |
| CN | 102957799 A | 3/2013 |
| CN | 103019563 A | 4/2013 |
| CN | 103297837 A | 9/2013 |
| CN | 103442132 A | 12/2013 |
| CN | 102946520 B | 12/2016 |
| DE | 10310794 | 9/2004 |
| DE | 69937592 | 10/2008 |
| EP | 0880090 | 11/1998 |
| WO | 2004051392 | 6/2004 |
| WO | 2014067206 A1 | 5/2014 |

OTHER PUBLICATIONS

Russell Speight Vanblon, Neal Robert Caliendo Jr.; "Magnification Based on Eye Input" file history of related U.S. Appl. No. 14/546,962, filed Nov. 18, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Axel Ramirez Flores, Jennifer Greenwood Zawacki, Alan Ladd Painter, "Skin Mounted Input Device" file history of related U.S. Appl. No. 14/1162,115, filed Jan. 23, 2014.

Axel Ramirez Flores, Rod David Waltermann, James Anthony Hunt, Bruce Douglas Gress, James Alan Lacroix, "Gasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of related U.S. Appl. No. 14/548,938, filed Nov. 20, 2014.

Wikipedia, "Electromyography", definition; http://en.wikipedia.org/wiki/Electromyogrpahy, printed from website Jan. 27, 2015.

ISOURCE: "Raise to Speak Makes Siri Wonderfully Useful (Once You Know How to Use It)", http:///isource.com/10/01/raise-to-speak-makes-siri-wonderfully-useful-once-you-know-how-to-use-it./ Web printout Nov. 15, 2013.

Tactus Technology, "Taking Touch Screen Interfaces Into a New Dimension", 2012 (13 pages).

Arthur Davis, Frank Kuhnlenz, "Optical Design Using Fresnel Lenses, Basic Principles and some Practical Examples" Optik & Photonik, Dec. 2007.

Superfocus, "See the World in Superfocus Revolutionary Eyeglasses Give You the Power to Focus Your Entire View at Any Distance", http://superfocus.com/eye-care-practitioners, printed from website Jun. 24, 2014.

Darren Quick, "PixelOptics to Launch 'world's first electronic focusing eyewear'", http://www.gizmag.com/pixeloptics-empower-electroni-focusing-glasses/17569/. Jan. 12, 2011.

Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.

Wikipedia, "Extended Display Identification Data", Definition; http://en.wikipedia.org/wiki/Extended_display_Identification_data, printed from website Oct. 10, 2014.

Extron , "Digital Connection, Understanding EDID—Extended Display Identification Data", Fall 2009, www.extron.com.

"Relationship Between Inches, Picas, Points, Pitch, and Twips", Article ID: 76388; http://support2.microsoft.com/KB/76388. Printed Oct. 10, 2014.

Wikipedia, "Polarizer" Definition; http://en.wikipedia.org/wiki/Polarizer, printed from website Jan. 14, 2015.

Wikepedia, "Smart Glass" Definition, http://en.wikipedia.org/wiki/Smart_glass, printed from website Jan. 14, 2015.

Wikipedia, "Microphone array", definition, http://en.wikipedia.org/wiki/Microphone_array, printed from website Jan. 22, 2015.

Wikipedia, "Beamforning", definition; http://en.wikipedia.org/wiki/Beamforming, printed from website Jan. 22, 2015.

"Understanding & Using Directional Microphones", http://www.soundonsound.com/sos/sep00/articles/direction.htm; Published in SOS Sep. 2000.

Wikipedia, "Microphone", definition; http://en.wilipedia.org/wkik/microphone, printed from website Jan. 22, 2015.

Thalmiclabs, "Myo-Tech Specs", http://www.thalmic.com/en/myo/techspecs, printed from website Jan. 27, 2015.

Thalmiclabs, "Myo Gesture Control Armband" http://www.thalmic.com/en/myo, printed from website Jan. 27, 2015.

\* cited by examiner

DETECTING NOISE OR OBJECT INTERRUPTION IN AUDIO VIDEO VIEWING AND ALTERING PRESENTATION BASED THEREON

FIELD

The present application relates generally to detecting noise or object interruptions in audio video viewing and altering presentation based thereon.

BACKGROUND

A user when viewing an audio video program may be interrupted by someone talking, or by answering the phone, or by a person moving between the viewer and the display, which can be annoying, disruptive, and undesirable.

SUMMARY

Accordingly, in a first aspect an apparatus includes a processor and a memory accessible to the processor. The memory bears instructions executable by the processor to, while an audio video presentation is being presented, determine that a presence of an audible sound that is not part of the audio video presentation satisfies a threshold, and responsive to determining that the audible sound satisfies the threshold, alter a presentation of the audio video presentation.

In another aspect, a method includes detecting a viewer has been interrupted from watching an audio video content at least in part by detecting an audible sound not part of the audio video content and satisfying a threshold, or by detecting that an object moves between the viewer and a display presenting the audio video content, or by both detecting an audible sound not part of the audio video content and satisfying a threshold and detecting that an object moves between the viewer and a display presenting the audio video content. The method includes, responsive to detecting that the viewer has been interrupted from watching the audio video content, altering a presentation of the audio video content.

In another aspect, a device includes a processor and a memory accessible to the processor and bearing instructions executable by the processor to determine that a user has been interrupted in watching an audio video content by a noise or by an object being interposed between the user and a display presenting the audio video content or by both a noise and an object being interposed between the user and the display. Responsive to determining that the user has been interrupted, the processor alters a presentation of the audio video content.

The details of present principles, both as to their structure and operation, can best be understood in reference to the accompanying drawings, in which like reference numerals refer to like parts, and in which:

DETAILED DESCRIPTION

Figure 1:
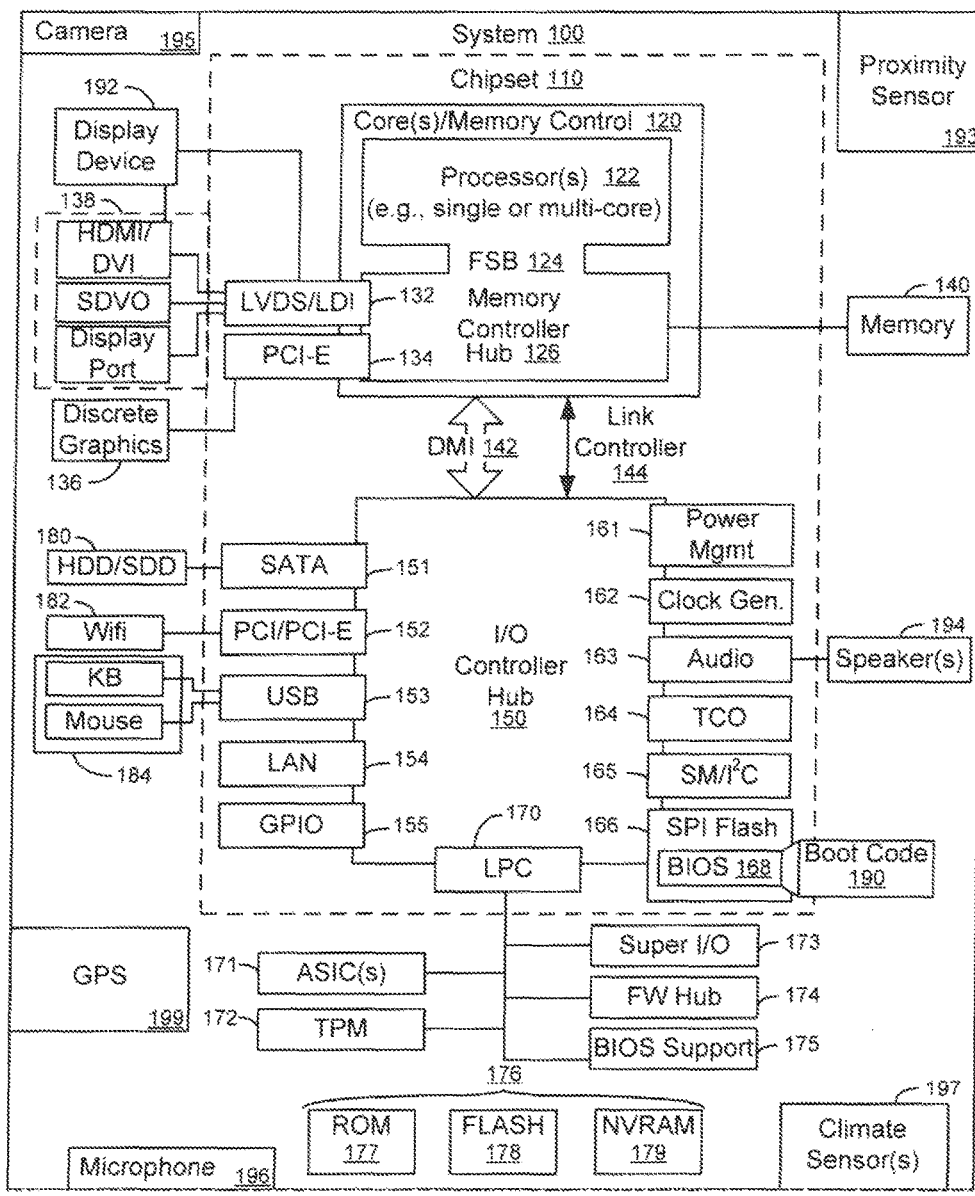
FIG. 1 is a block diagram of an exemplary device in accordance with present principles.

This disclosure relates generally to (e.g. consumer electronics (CE)) device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term"circuit" or "circuitry" is used in the summary, description, and/or claims. As is well known in the art, the term"circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1, it shows an exemplary block diagram of an exemplary computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, so-called "convertible" devices such as e.g. a tablet that may be converted to a laptop by virtue of being connected to a soft keyboard, and/or other smart devices, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional"northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include sensors and/or a sensor array including e.g. a proximity, infrared, sonar, and/or heat sensor 193 providing input to the processor 122 and configured in accordance with present principles for sensing e.g. body heat of a person and/or the proximity of at least a portion of the person to at least a portion of the system 100 such as the sensor 193 itself. Also in some embodiments, the system 100 may include one or more cameras 195 providing input to the processor 122. The camera 195 may be, e.g., a thermal imaging camera, a digital camera such as a webcam, and/or a camera integrated into the system 100 and controllable by the processor 122 to gather pictures/images and/or video in accordance with present principles (e.g. to gather one or more images of eyes to apply eye tracking software to the image(s) as set forth below). Moreover, the system 100 may include an audio receiver/microphone (e.g. a microphone or microphone array) 196 for e.g. entering input such as a command to the system 100 in accordance with present principles.

In addition to the foregoing, the system 100 may include one or more climate sensors 197 (such as e.g., an (e.g. ambient) light sensor, a temperature sensor, a humidity sensor, and/or an environmental sensor) providing input to the processor 122. The system 100 may also include one or more motion sensors 198 (such as e.g., an accelerometer and/or a gesture sensor (e.g. for sensing gestures in free space associated by the device with commands in accordance with present principles), etc.) providing input to the processor 122 in accordance with present principles. Though not shown, still other sensors may be included and their output used in accordance with present principles, such as e.g. biometric sensors, sound sensors, orientation sensors, location sensors, scan sensors, and/or time sensors. Also note that a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
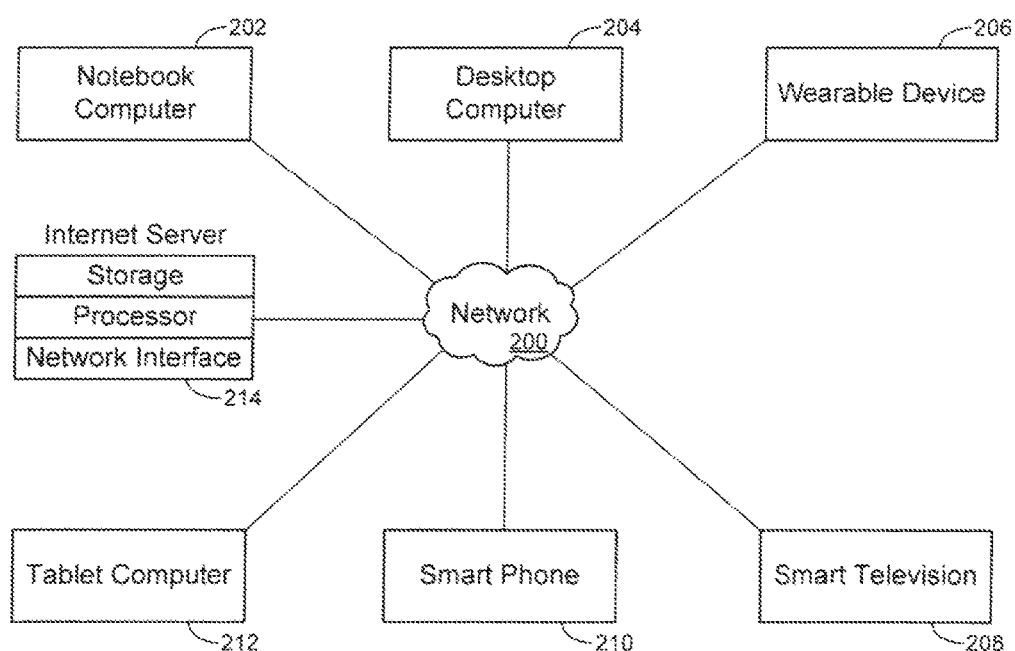
FIG. 2 is a block diagram of a network of devices in accordance with present principles.

Before moving on to FIG. 2 and as described herein, it is to be understood that an exemplary device or other machine/computer may include fewer or more features than shown on the system 100 of FIG. 1. In any case, it is to be understood at least based on the foregoing that the system 100 is configured to undertake present principles (e.g. receive input from a user, provide output based on the input, store and execute and/or undertake the logic described below, and/or perform any other functions and/or operations described herein).

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
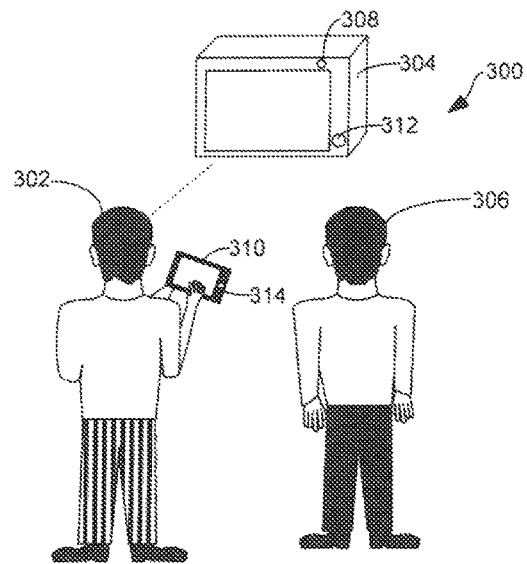
FIG. 3 is a block diagram of a specific implementation of the systems shown in FIGS. 1 and 2.

FIG. 3 shows an example system 300 that may use one or more of the devices/methods/networks described above. A viewer 302 of an audio video program being presented on a computerized display device 304 such as a networked TV may be interrupted during viewing, triggering logic below. One mode of interruption may be by another person 306 speaking during viewing or interposing himself between the viewer 302 and the display device 304 as sensed by, e.g., a camera or proximity sensor 308 (or multiple cameras and/or proximity sensors) on the display device 304 or elsewhere imaging the person 306 in front (relative to the display device 304) of the viewer 302 and inferring from this image that the viewer is blocked at least partially from seeing the display device 304. The viewer 302 may also employ a secondary or control device 310 such as but not limited to smart phone, a tablet computer, a TV remote control, etc. that may communicate with the display device 304 via WiFi, Bluetooth, infrared (IR), etc.

The control device 310 may execute the logic below and/or the display device 304 may execute the logic below. The audio video program may be presented on the control device 310 in lieu of or in addition to presenting the A/V on the display device 304. When the A/V is presented on the display device 304 and the control device 310 executes the logic, the control device 310 may receive input from the display device indicating, e.g., that the person 306 has been imaged between the viewer 302 and the display device 304 or other input, and may execute the logic below by commanding the display device 304 to alter a presentation of the A/V. The command may be sent using any of the links above and may use the command codes normally encoded in IR-driven remote controls associated with the display device 304. The logic regardless of where executed may also receive audible signals from a microphone 312 on the display device 304 and/or a microphone 314 on the control device 310.

Figure 4:
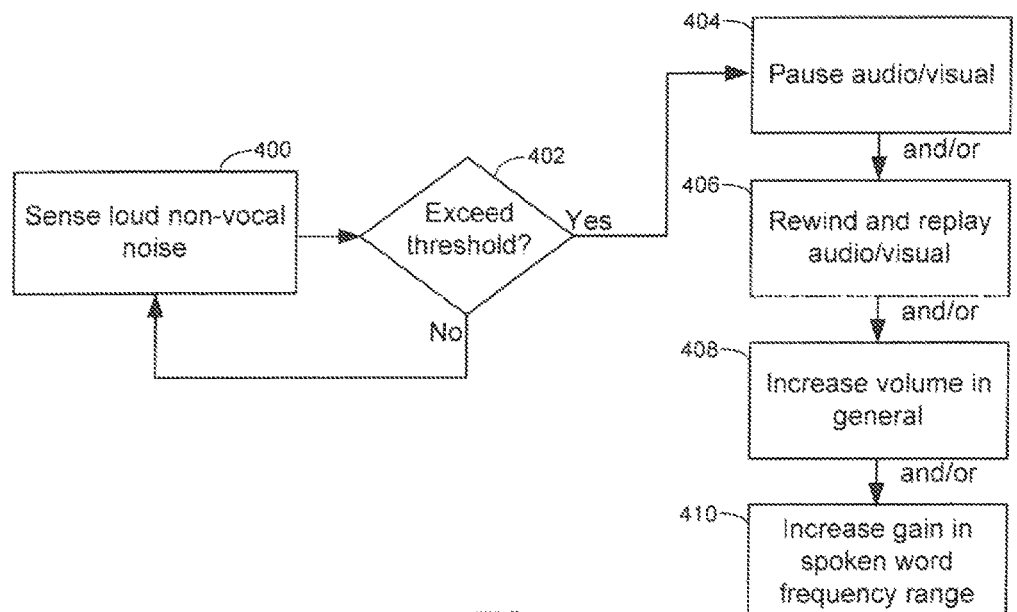
FIGS. 4-7 are flow charts of example logic according to present principles.

Now in reference to FIG. 4, an example flowchart is shown of logic to be executed by a device such as the system 100 and/or 300 described above (e.g. such a device undertaking the logic of FIG. 4 referred to when describing FIG. 4 as "the device") in accordance with present principles. Beginning at block 400, the logic senses an interruption, in the case of FIG. 4, a loud non-vocal noise. Proceeding to decision diamond 402 the interruption sensed at block 400 is compared to a threshold, e.g., a threshold amplitude and if desired frequency or frequency range, to determine whether the interruption sensed at block 400 exceeds the threshold.

If the interruption exceeds the threshold, the logic moves to any one or more of blocks 404-410. At block 404 the A/V program (e.g., on the display device 304) is paused. In addition or alternatively, at block 406 the A/V program may be rewound and replayed, e.g., from the point in the A/V at which the interruption was determined to violate the threshold. In addition or alternatively the logic may move to block 408 to increase the overall volume of the A/V. The amount by which the volume is increased may be proportional to the amount by which the interruption exceeded the threshold. In addition or alternatively the logic may move to block 410 to increase the signal gain in only the frequency band of the audio corresponding to the spoken word (human voice). This may be done by commanding the playback device to increase the EQ in the target frequency range, for instance.

Figure 5:
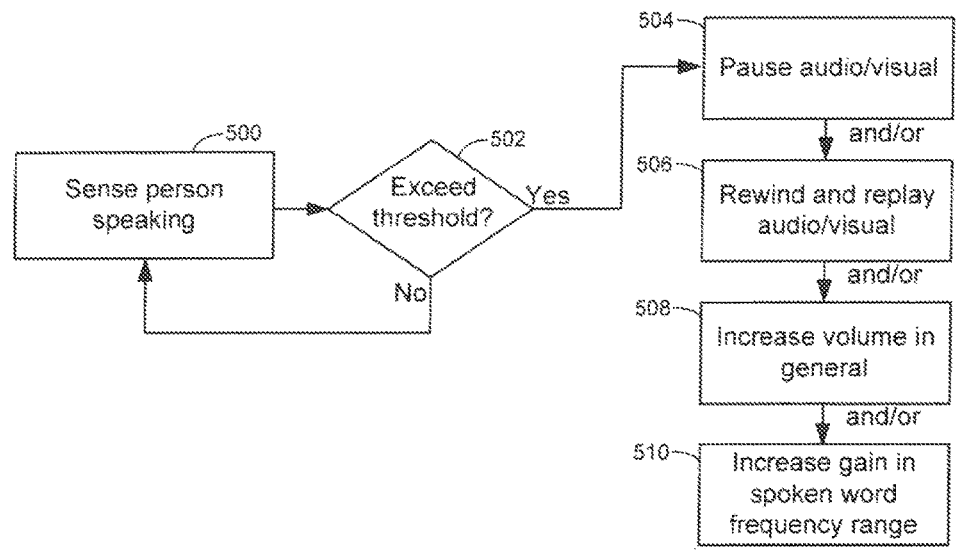

Now in reference to FIG. 5, an example flowchart is shown of logic to be executed by a device such as the system 100 and/or 300 described above (e.g. such a device undertaking the logic of FIG. 5 referred to when describing FIG. 5 as "the device") in accordance with present principles. Beginning at block 500, the logic senses an interruption, in the case of FIG. 5, a voice of the person 306 who may be speaking to the listener 302 during play of the A/V. It may be inferred from voice recognition (which may recognize the voice of the viewer 302 through training but not the voice of other people) or from face recognition noting that the mouth of the person 306 is moving and not the mouth of the viewer 302 that a non-viewing person is speaking. It will readily be appreciated that sound and image input may be received from the microphones and cameras, respectively, described above. Proceeding to decision diamond 502 the interruption sensed at block 500 is compared to a threshold, e.g., a threshold amplitude and if desired frequency or frequency range, to determine whether the interruption sensed at block 500 exceeds the threshold.

If the interruption exceeds the threshold, the logic moves to any one or more of blocks 504-510. At block 504 the A/V program (e.g., on the display device 304) is paused. In addition or alternatively, at block 506 the A/V program may be rewound and replayed, e.g., from the point in the A/V at which the interruption was determined to violate the threshold. In addition or alternatively the logic may move to block 508 to increase the overall volume of the A/V. The amount by which the volume is increased may be proportional to the amount by which the interruption exceeded the threshold. In addition or alternatively the logic may move to block 510 to increase the signal gain in only the frequency band of the audio corresponding to the spoken word (human voice).

Figure 6:
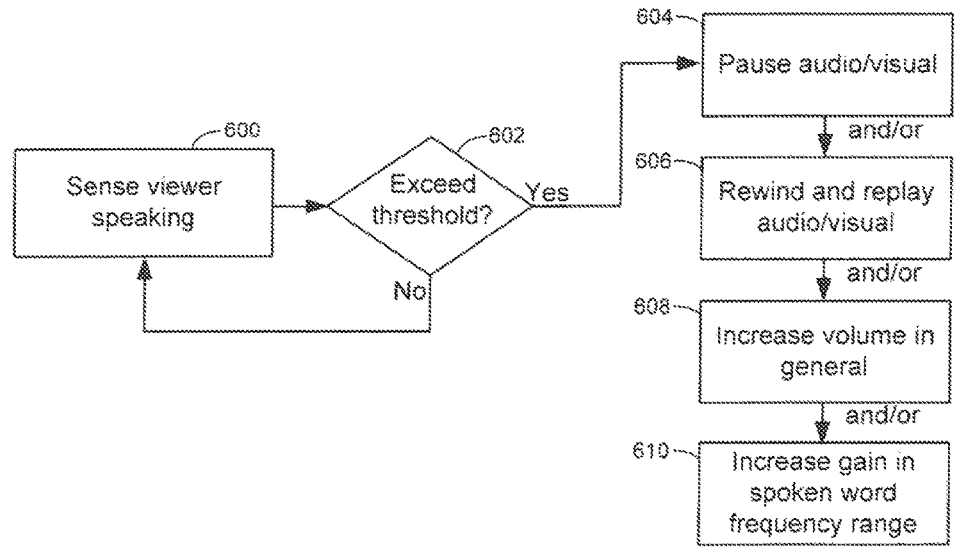

Now in reference to FIG. 6, an example flowchart is shown of logic to be executed by a device such as the system 100 and/or 300 described above (e.g. such a device undertaking the logic of FIG. 6 referred to when describing FIG. 6 as "the device") in accordance with present principles. Beginning at block 600, the logic senses an interruption, in the case of FIG. 6, the voice of the viewer (listener) 302 during play of the A/V. It may be inferred from voice recognition (which may recognize the voice of the viewer 302 through training) or from face recognition noting that the mouth of the viewer 302 is moving. It will readily be appreciated that sound and image input may be received from the microphones and cameras, respectively, described above. Proceeding to decision diamond 602 the interruption sensed at block 600 is compared to a threshold, e.g., a threshold amplitude and if desired frequency or frequency range, to determine whether the interruption sensed at block 600 exceeds the threshold.

If the interruption exceeds the threshold, the logic moves to any one or more of blocks 604-610. At block 604 the A/V program (e.g., on the display device 304) is paused. In addition or alternatively, at block 606 the A/V program may be rewound and replayed, e.g., from the point in the A/V at which the interruption was determined to violate the threshold. In addition or alternatively the logic may move to block 608 to increase the overall volume of the A/V. The amount by which the volume is increased may be proportional to the amount by which the interruption exceeded the threshold. In addition or alternatively the logic may move to block 610 to increase the signal gain in only the frequency band of the audio corresponding to the spoken word (human voice).

Figure 7:
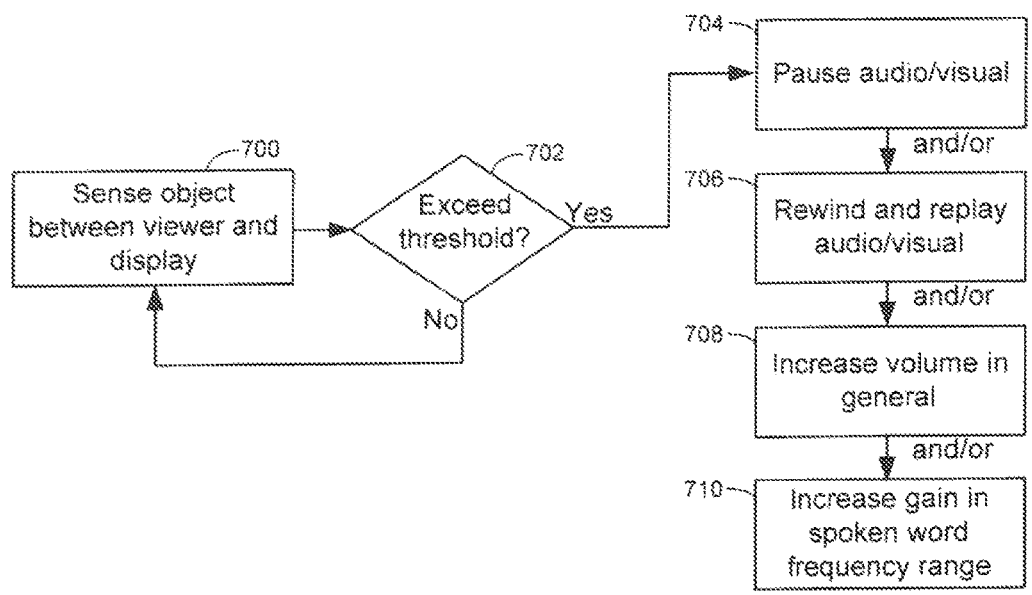

Now in reference to FIG. 7, an example flowchart is shown of logic to be executed by a device such as the system 100 and/or 300 described above (e.g. such a device undertaking the logic of FIG. 7 referred to when describing FIG. 7 as "the device") in accordance with present principles. Beginning at block 700, the logic senses an interruption, in the case of FIG. 7, an object such as the person 306 being interposed between the viewer 302 and the display device. In one implementation a proximity sensor on the display device senses an object having moved closer to the display device than the viewer 302, who may be recognized as such using signals from the camera on the display device imaging the viewer's eyes being directed to the display. In another implementation images from the camera are used to determine that a person who is not imaged as watching the display has moved between a person who is watching the display, again based on, for example, image recognition of where the people's eyes are looking.

Proceeding to decision diamond 702 the interruption sensed at block 700 is compared to a threshold to determine whether the interruption sensed at block 700 exceeds the threshold. In one example, if the viewer's line of sight to the display device have been obstructed, the threshold is violated; otherwise, it is not even if other portions of the viewer's body have been obstructed vis-à-vis the display device. In another example, if any part of the viewer's body vis-à-vis the display device is obstructed, the threshold is violated.

If the interruption exceeds the threshold, the logic moves to any one or more of blocks 704-710. At block 704 the A/V program (e.g., on the display device 304) is paused. In addition or alternatively, at block 706 the A/V program may be rewound and replayed, e.g., from the point in the A/V at which the interruption was determined to violate the threshold. In addition or alternatively the logic may move to block 708 to increase the overall volume of the A/V. The amount by which the volume is increased may be proportional to the amount by which the interruption exceeded the threshold. In addition or alternatively the logic may move to block 710 to increase the signal gain in only the frequency band of the audio corresponding to the spoken word (human voice).

In any of the flow charts above, scenes from the A/V may be prioritized when taking action on a program. For example, dialog and action scenes (as indicated by, e.g., MPEG motion vectors exceeding a threshold plus audio amplitude in the human voice frequency range exceeding a threshold) may be accorded a relatively low "interruption" threshold and thus have their presentations altered relatively more often in the presence of interruptions, whereas scenes with little action and/or no speaking may have a relatively high "interruption" threshold and thus have their presentations altered relatively less often in the presence of interruptions. Moreover, if an initial interruption is detected which is insufficient to trigger a presentation alteration but that then escalates to trigger a presentation alteration, the point to which the A/V is rewound and replayed from may be moved back to before the time of the initial interruption, not just back to the time when the initial interruption escalated past the threshold. A maximum rewind time may be specified beyond which the A/V is not to be rewound and replayed in the presence of an interruption. If multiple potential rewind points exist, the user can be prompted on the display device or control device to select the point they want to rewind to.

Each of the algorithms shown in FIGS. 4-7 may be implemented separately from the other algorithms or multiple algorithms may be used for altering A/V presentation based on multiple types of interruptions.

While the particular DETECTING NOISE OR OBJECT INTERRUPTION IN AUDIO VIDEO VIEWING AND ALTERING PRESENTATION BASED THEREON is herein shown and described in detail, it is to be understood that the subject matter which is encompassed by the present application is limited only by the claims.

What is claimed is:

1. An apparatus, comprising:
   at least one processor;
   storage accessible to the at least one processor and bearing instructions executable by the at least one processor to:
   while an audio video presentation is being presented, identify one of: a first threshold associated with a first type of scene that is currently being presented as part of the audio video presentation, and a second threshold associated with a second type of scene that is currently being presented as part of the audio video presentation; the first type of scene being different from the second type of scene, the first threshold being different from the second threshold, the audio video presentation comprising at least one segment of each of the first type of scene and the second type of scene;
   based on the identification, determine that an audible sound that is not part of the audio video presentation satisfies the identified threshold; and
   responsive to the determination that the audible sound satisfies the identified threshold, alter a presentation of the audio video presentation.

2. The apparatus of claim 1, wherein the instructions are executable by the at least one processor to alter the presentation of the audio video presentation responsive to the determination that the audible sound satisfies the identified threshold at least in part by pausing play of the audio video presentation.

3. The apparatus of claim 1, wherein the instructions are executable by the at least one processor to alter the presentation of the audio video presentation responsive to the determination that the audible sound satisfies the identified first threshold at least in part by replaying a portion of the audio video presentation by no more than a predetermined maximum replay amount.

4. The apparatus of claim 1, wherein the first and second thresholds are threshold amplitudes.

5. The apparatus of claim 1, wherein the instructions are executable by the at least one processor to:
   based on a determination that an audible sound that is not part of the audio video presentation is present but does not satisfy the identified threshold, identify a first portion of the audio video presentation presented before the audible sound that does not satisfy the identified threshold;
   subsequent to presentation of the first portion of the audio video presentation, present a second portion of the audio video presentation different from the first portion;
   determine, during presentation of the second portion, that an audible sound that is not part of the audio video presentation is present and satisfies the identified threshold; and
   in response to the determination that an audible sound that is not part of the audio video presentation is present and satisfies the identified threshold, present the first portion of the audio video presentation and increase volume of audio in the audio video presentation commensurate with the amount by which the audible sound exceeds the identified threshold.

6. The apparatus of claim 1, wherein the first type of scene is an action scene.

7. The apparatus of claim 6, wherein the second type of scene is a dialog scene.

8. The apparatus of claim 1, wherein the instructions are executable by the at least one processor to alter the presentation of the audio video presentation at least in part by increasing volume of audio in the audio video presentation.

9. A method, comprising:
   while audio video content is being presented, identifying one of: a first threshold associated with a first type of scene that is currently being presented as part of the audio video content, and a second threshold associated with a second type of scene that is currently being presented as part of the audio video content; the first type of scene being different from the second type of scene, the first threshold being different from the second threshold, the audio video content comprising at least one segment of each of the first type of scene and the second type of scene;
   detecting a viewer has been interrupted from watching the audio video content at least in part by determining that an audible sound that is not part of the audio video content satisfies the identified threshold; and
   responsive to determining that the audible sound that is not part of the audio video content satisfies the identified threshold, altering presentation of the audio video content.

10. The method of claim 9, comprising detecting a viewer has been interrupted from watching the audio video content at least in part by determining that an object moves between the viewer and a display presenting the audio video content.

11. The method of claim 9, comprising altering presentation of the audio video content at least in part by pausing play of the audio video content.

12. The method of claim 9, comprising altering presentation of the audio video content at least in part by increasing a gain of audio for the audio video content in a frequency range corresponding to human speech and not increasing gain of audio for the audio video content outside the frequency range.

13. The method of claim 9, comprising altering presentation of the audio video content at least in part by replaying part of the audio video content.

14. The method of claim 9, comprising:
   based on determining that plural potential alterations of presentation of the audio video content exist, presenting a prompt at which a user may select at least one of plural potential rewind points within the audio video content.

15. The method of claim 9, wherein the first and second types of scene are selected from the group comprising: an action scene, a dialog scene.

16. The method of claim 9, comprising:
   altering presentation of the audio video content at least in part by increasing volume of audio for the audio video content.

17. A computer readable storage medium (CRSM) that is not a transitory signal, the CRSM comprising instructions executable by at least one processor to:
   while audio video content is being presented, identify one of: a first threshold associated with a first type of scene that is currently being presented as part of the audio video content, and a second threshold associated with a second type of scene that is currently being presented as part of the audio video content; the first type of scene being different from the second type of scene, the first threshold being different from the second threshold, the audio video content comprising at least one segment of each of the first type of scene and the second type of scene;

determine that a user has been interrupted in watching the audio video content at least by determining that an audible sound that is not part of the audio video content satisfies the identified threshold; and responsive to determining that the audible sound that is not part of the audio video content satisfies the identified threshold, alter presentation of the audio video content.

18. The CRSM of claim 17, wherein presentation of the audio video content is altered at least in part by at least one of: pausing play of the audio video content, replaying part of the audio video content, increasing volume of audio for the audio video content presentation.

19. The CRSM of claim 17, wherein the instructions are executable to:

determine whether the user has been interrupted in watching the audio video content at least by an object being interposed between the user and a display; and responsive to determining that the user has been interrupted at least by an object being interposed between the user and the display, alter presentation of the audio video content.

20. The CRSM of claim 17, wherein the instructions are executable by the at least one processor to:

determine that a user has been interrupted in watching the audio video content at least by determining that the audible sound that is not part of the audio video content satisfies the identified threshold and determining that the audible sound is from a person that is not a viewer of the audio video content.

* * * * *